(12) United States Patent
Kim

(10) Patent No.: US 7,210,244 B2
(45) Date of Patent: May 1, 2007

(54) DISTANCE CALCULATION DEVICE

(76) Inventor: Ki Suk Kim, 115-309 Doosan Apt., Gumho-dong 3ga, Seongdong-gu, Seoul (KR) 133-751

( * ) Notice: Subject to any disclaimer, the term of this patent is extended or adjusted under 35 U.S.C. 154(b) by 0 days.

(21) Appl. No.: 10/556,695

(22) PCT Filed: May 13, 2004

(86) PCT No.: PCT/KR2004/001118

§ 371 (c)(1), (2), (4) Date: Nov. 14, 2005

(87) PCT Pub. No.: WO2004/102113

PCT Pub. Date: Nov. 25, 2004

(65) Prior Publication Data

US 2006/0277781 A1    Dec. 14, 2006

(30) Foreign Application Priority Data

May 14, 2003  (KR) ........................ 10-2003-0030479

(51) Int. Cl.
*G01B 11/02* (2006.01)
*G01B 3/12* (2006.01)

(52) U.S. Cl. ............................. 33/700; 33/707; 33/773

(58) Field of Classification Search ................ 33/1 PT, 33/700, 706, 707, 734, 735, 737, 743, 772, 33/773, 775, 779, 780, 781, 782; 356/614, 356/615, 634
See application file for complete search history.

(56) References Cited

U.S. PATENT DOCUMENTS

| | | | | |
|---|---|---|---|---|
| 1,942,130 A | * | 1/1934 | Woodcock | .................. 33/782 |
| 5,067,249 A | * | 11/1991 | Terrigno | ....................... 33/773 |
| 5,485,682 A | * | 1/1996 | Le Breton | ................... 33/773 |
| 5,560,119 A | | 10/1996 | LeBreton | |
| 5,780,846 A | | 7/1998 | Angilella et al. | |
| 5,943,785 A | | 8/1999 | Kondo | |
| 6,574,882 B1 | * | 6/2003 | Kondo | ......................... 33/773 |
| 6,714,311 B2 | * | 3/2004 | Hashimoto | .................. 356/614 |
| 2003/0106231 A1 | * | 6/2003 | Kondo | ......................... 33/780 |
| 2004/0068886 A1 | * | 4/2004 | Trout et al. | .................... 33/773 |

FOREIGN PATENT DOCUMENTS

JP          60-036901          2/1985

* cited by examiner

*Primary Examiner*—G. Bradley Bennett
(74) *Attorney, Agent, or Firm*—Thelen Reid Brown Raysman & Steiner LLP

(57) ABSTRACT

Provided is a distance calculating apparatus calculating a real distance from a map distance of a map path connecting a first point and a second point on a map, the apparatus including: a housing; a scale input unit into which a reduced scale is input, disposed in the housing; an optical sensor unit disposed in the housing, the optical sensor unit sensing movement of the housing using light and outputting an electrical signal when the housing is moved along the map path; a calculation unit disposed in the housing, the calculation unit calculating the map distance using the electrical signal input from the optical sensor unit and calculating the real distance using the map distance and the reduced scale input from the scale input unit; and a display unit disposed in the housing, the display unit displaying the real distance calculated by the calculation unit. The distance calculating apparatus can conveniently and accurately obtain the real distance by only inputting a reduced scale of a map and moving the apparatus along a path connecting two points on the map.

3 Claims, 5 Drawing Sheets

DISTANCE CALCULATION DEVICE

CROSS-REFERENCE TO RELATED APPLICATION

This application claims priority based on International Patent Application No. PCT/KR2004/001118, entitled "Distance Calculation Device by Ki-Suk KIM, which claims priority of Korean Application No. 10-2003-0030479, filed on May 14, 2003.

TECHNICAL FIELD

The present invention relates to a distance calculating apparatus, and more particularly to a distance calculating apparatus including a display window displaying a real distance corresponding to an arbitrary path between two points on a map, when a reduced scale of the map is input to the apparatus and the apparatus is moved along the arbitrary path connecting the two points on the map.

BACKGROUND ART

In general, maps are figures in which a part or all of the earth's surface is expressed on a plane with a reduced scale, and seas, mountains, streams, land, etc. are expressed using various symbols, characters, colors, etc. Examples of the maps include topographical maps, land registration maps, etc. The reduced scale is a ratio of a distance on a map with respect to a real distance corresponding to the distance on the map. For example, the reduced scale can be expressed as of 1:100,000 or 1/100,000, which means that a real distance is represented on a map by a distance equal to 1/100,000 of the real distance. The reduced scale can be different depending upon the map used and is generally displayed at an upper or lower end of the map. The accuracy of a map is proportional to the reduced scale of the map.

Maps can be used for various purposes such as searching for paths or desired places, observing topographies, calculating areas of regions, etc. Among the various purposes, maps are frequently used for calculating a distance of a road connecting two real positions or a direct distance between two positions. That is, maps are used for calculating a distance that must be traveled to get from a position to another position.

Conventionally, troublesome procedures must be performed to obtain a real distance of a real path connecting two real positions using a map. That is, in order to obtain a real distance of a real path, first, a first point and a second point corresponding to the two real positions are chosen. Then, when the map path connecting the first point and the second point is linear, the map distance can be obtained using a ruler. When the map path connecting the first point and the second point is curved, the map distance can be obtained by attaching a wet thread to the map along the map path, detaching the wet thread from the map, stretching the wet thread straight, and then measuring the length of the wet thread corresponding to the map path using a ruler. The map distance may also be obtained using an opisometer. The real distance is calculated by multiplying the obtained map distance by the reduced scale displayed on the map.

Even when using the opisometer, it is very inconvenient to obtain the real distance using the above method, and it may be impossible to obtain a real distance corresponding to a continuously curved path using the above method.

DETAILED DESCRIPTION OF THE INVENTION

Technical Goal of the Invention

Figure 1:
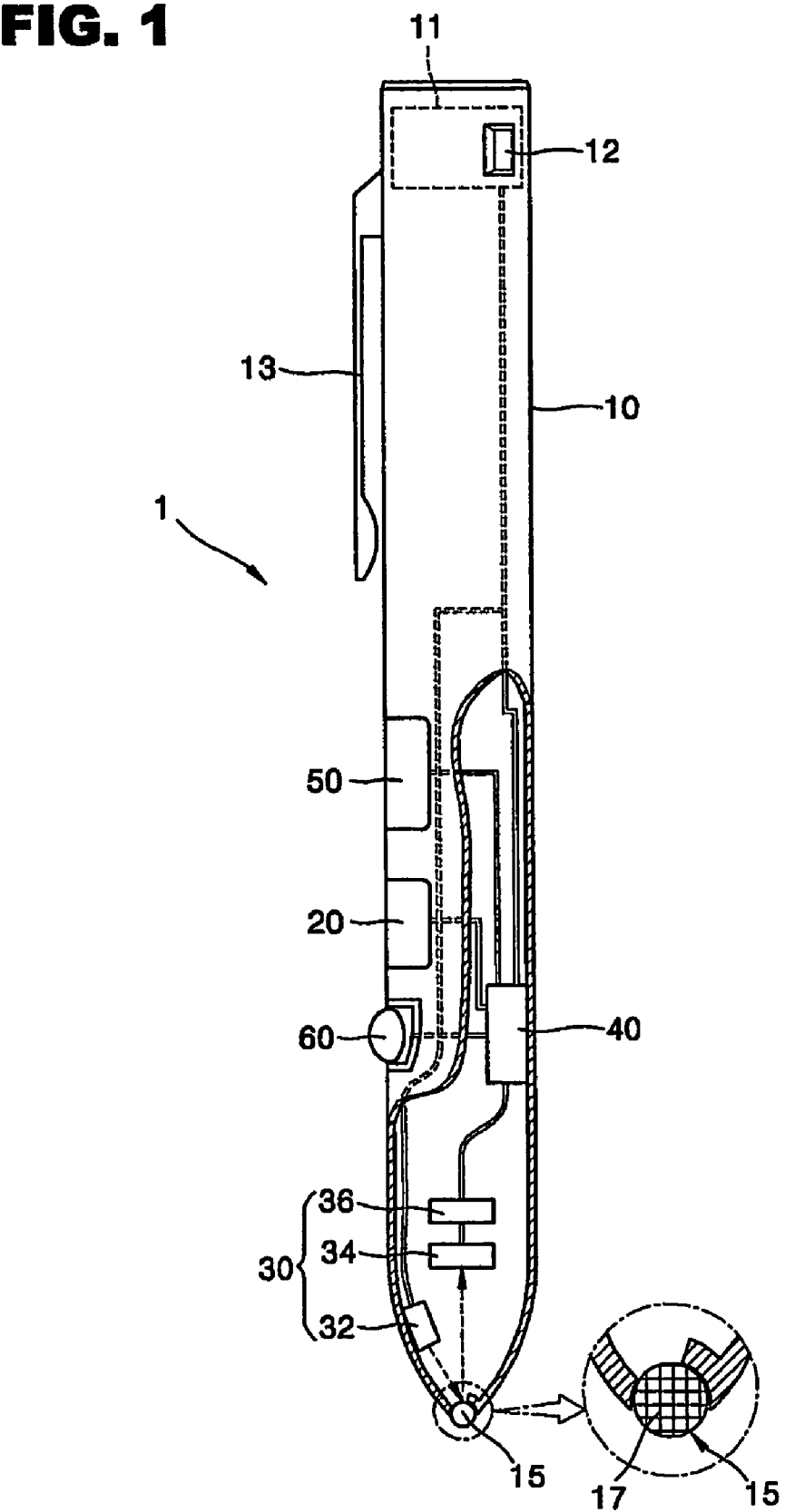
FIG. 1 is a diagram schematically illustrating a distance calculating apparatus according to a first embodiment of the present invention.

The present invention provides a distance calculating apparatus capable of displaying a real distance in a display unit by only inputting a reduced scale of a map and moving the apparatus along a map path corresponding to a real path of which a real distance is to be calculated.

Disclosure of the Invention

According to an aspect of the present invention, there is provided a distance calculating apparatus calculating a real distance from a map distance of a map path connecting a first point and a second point on a map, the apparatus comprising: a housing; a scale input unit into which a reduced scale is input, disposed in the housing; an optical sensor unit disposed in the housing, the optical sensor unit sensing movement of the housing using light and outputting an electrical signal when the housing is moved along the map path; a calculation unit disposed in the housing, the calculation unit calculating the map distance using the electrical signal input from the optical sensor unit and calculating the real distance using the map distance and the reduced scale input from the scale input unit; and a display unit disposed in the housing, the display unit displaying the real distance calculated by the calculation unit.

The optical sensor unit may comprise: a light emitter emitting light; a light receiver sensing light reflected after being emitted from the light emitter; and a conversion and output unit converting variations in the light sensed by the light receiver into an electrical signal and outputting the electrical signal when the housing is moved.

The housing may have a pen shape, the light emitter may be provided at the lower portion of the housing, and the light emitted from the light emitter may be incident on and reflected from the map.

The distance calculating apparatus may further comprise a rolling ball rotatably coupled to the lower end of the housing such that the housing can roll over a surface of the map while being in contact with the surface of the map when moving the housing along the map path, and the housing may have a pen shape.

The light emitter may be disposed inside the housing and the light emitted from the light emitter may be incident on and reflected from the rolling ball.

A lattice shaped pattern may be formed on a surface of the rolling ball such that the light receiver easily senses the variations in the light reflected from the rolling ball as the rolling ball rotates.

The housing may further comprise an input button unit indicating input to the calculation unit that the housing is positioned at the first point or the second point on the map.

Effect of the Invention

As described above, the distance calculating apparatus according to the present invention can conveniently and accurately obtain a real distance between two points by only inputting a reduced scale of a map and moving the distance calculating apparatus along a path connecting the two points on the map.

EMBODIMENTS

Hereinafter, exemplary embodiments of the present invention will be described in detail with reference to the attached drawings.

Figure 2:
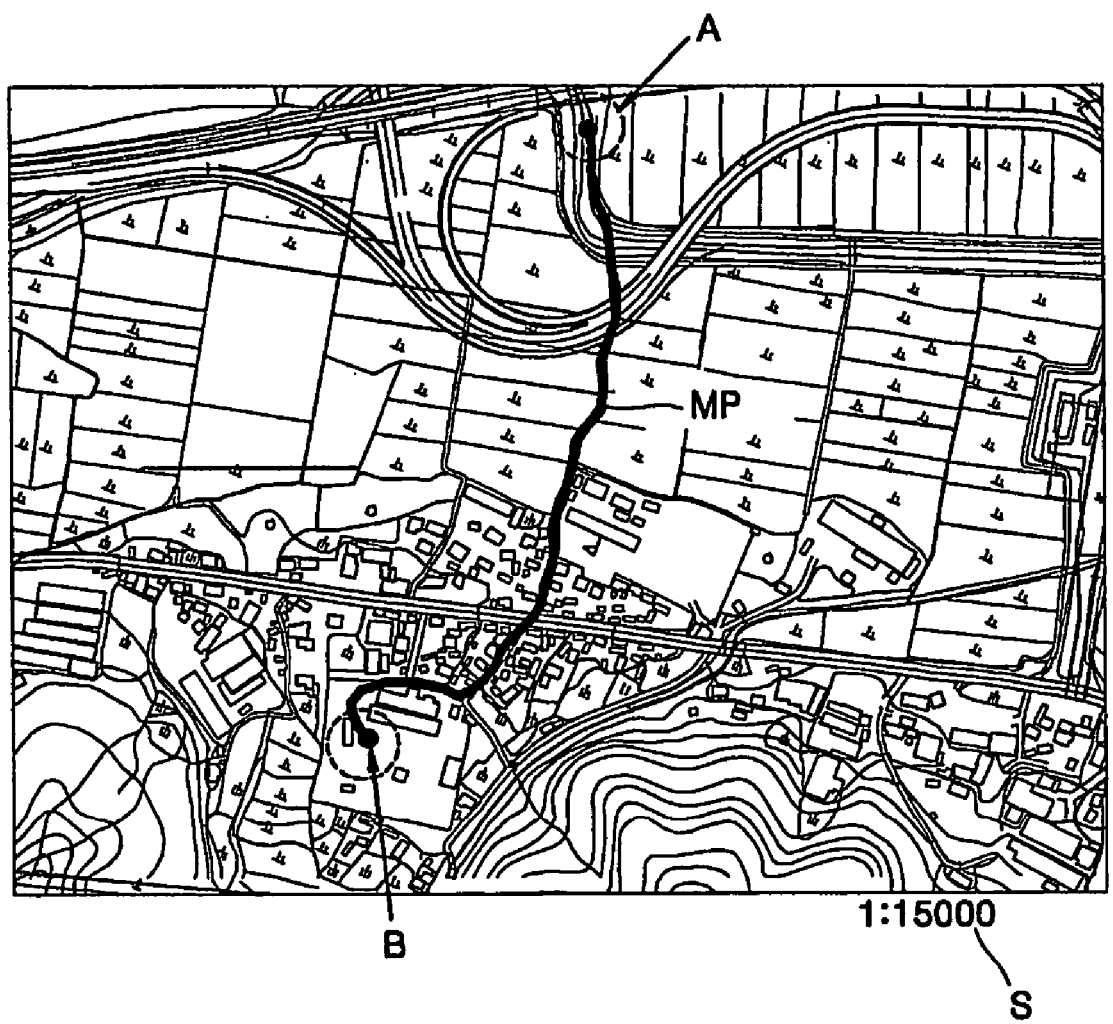
FIG. 2 is a map exemplified for explaining usage of the distance calculating apparatus shown in FIG. 1.

FIG. 1 is a perspective view illustrating a distance calculating apparatus according to an embodiment of the present invention of which a part is cut off and FIG. 2 is a map exemplified for explaining usage of the distance calculating apparatus shown in FIG. 1.

Referring to FIGS. 1 and 2, the distance calculating apparatus 1 according to the present embodiment is used to calculate a real distance from a map distance, which is a length of a map path MP connecting a first point A to a second point B, and comprises a housing 10, a scale input unit 20, an optical sensor unit 30, a calculation unit 40, a display unit 50, and an input button unit 60.

The housing 10 encases most of the components of the distance calculating apparatus 1 and other components are fitted thereto. The housing 10 can have a pen shape and comprises a power source unit 11, an on/off switch 12, a penclip 13, and a rolling ball 15.

The power source unit 11 is disposed inside the upper end portion of the housing 10 and supplies power required for operation of other components. A battery having a small volume can be used as the power source unit 11.

The on/off switch 12 can be disposed at the upper end portion of the housing and controls the flow of current to other components from the power source unit 11. The on/off switch 12 may be a push type switch which alternatively allows current to flow and prevents current from flowing when pressed.

The penclip 13 is disposed at the upper portion of the housing 10 and allows the distance calculating apparatus 1 to be conveniently attached to clothes or a map.

The rolling ball 15 is rotatably coupled to the lower end portion of the housing 10. Therefore, when a user grasps a body of the housing 10, brings the rolling ball 15 into contact with the surface of the map, and then moves the housing 10 along the map path, the rolling ball 15 rolls along the map path without slipping due to a frictional force between the rolling ball 15 and the surface of the map.

The rolling ball 15 has a lattice-shaped pattern 17. The lattice-shaped pattern 17 and a non-lattice pattern portion of the rolling ball 15 have at least one optical characteristic different from each other, for example, in reflectance, reflecting angle, degree of diffusion, etc.

A reduced scale S of the map of which a distance is to be measured is input via the scale input unit 20 using various methods of inputting numerals. For example, although not shown, the scale input unit 20 may include an input button unit, a selection button unit, and a scale display. In this case, the reduced scale S is input by pressing numeral buttons on a numeral plate of the input button unit, and the input of the reduced scale S is completed by pressing the selection button unit. At this time, the numeral buttons pressed may be displayed in the scale display.

The optical sensor unit 30 is disposed inside of the lower portion of the housing 10 and comprises a light emitter 32, a light receiver 34, and a conversion and output unit 36. When the housing 10 is moved along the map path, the optical sensor unit 30 senses the movement of the housing 10 using light and outputs an electrical signal corresponding to a distance of the sensed movement.

The light emitter 32 emits light by means of power supplied from the power source unit 11. The light emitter 32 may be a light emitting diode because a light emitting diode has small power consumption and high light intensity. In the present embodiment, the light emitted from the light emitter 32 is incident on and reflected from the rolling ball 15 disposed at the lower end portion of the housing 10.

The light receiver 34 senses the light emitted from the light emitter 32 and reflected from the rolling ball 15. Since the lattice-shaped pattern 17 has the varying light reflecting characteristics, the variations in the light reflected from the rolling ball 15 can be easily sensed by the light receiver 34 when the rolling ball 15 rolls.

The conversion and output unit 36 converts the variations in the light sensed by the light receiver 34 into an electrical signal and outputs the electrical signal. That is, when the rolling ball 15 of the housing 10 is moved along the map path and rotated, the light emitted from the light emitter 32 and reflected from the rolling ball 15 having the lattice-shaped pattern 17 continuously varies and the conversion and output unit 32 converts the variations in the light sensed by the light receiver 34 into an electrical signal and then outputs the electrical signal.

Since the arrangements of specific electrical circuits, etc. for sensing the variations of light or converting the variations of light into an electrical signal and outputting the electrical signal can be formed with well-known specific circuit diagrams and electronic components of the electrical circuits will not be presented.

The calculation unit 40 is disposed inside the housing 10 and calculats the real distance using the electrical signal input from the conversion and output unit 36 of the optical sensor unit 30 and the reduced scale input from the scale input unit 20.

Figure 3:
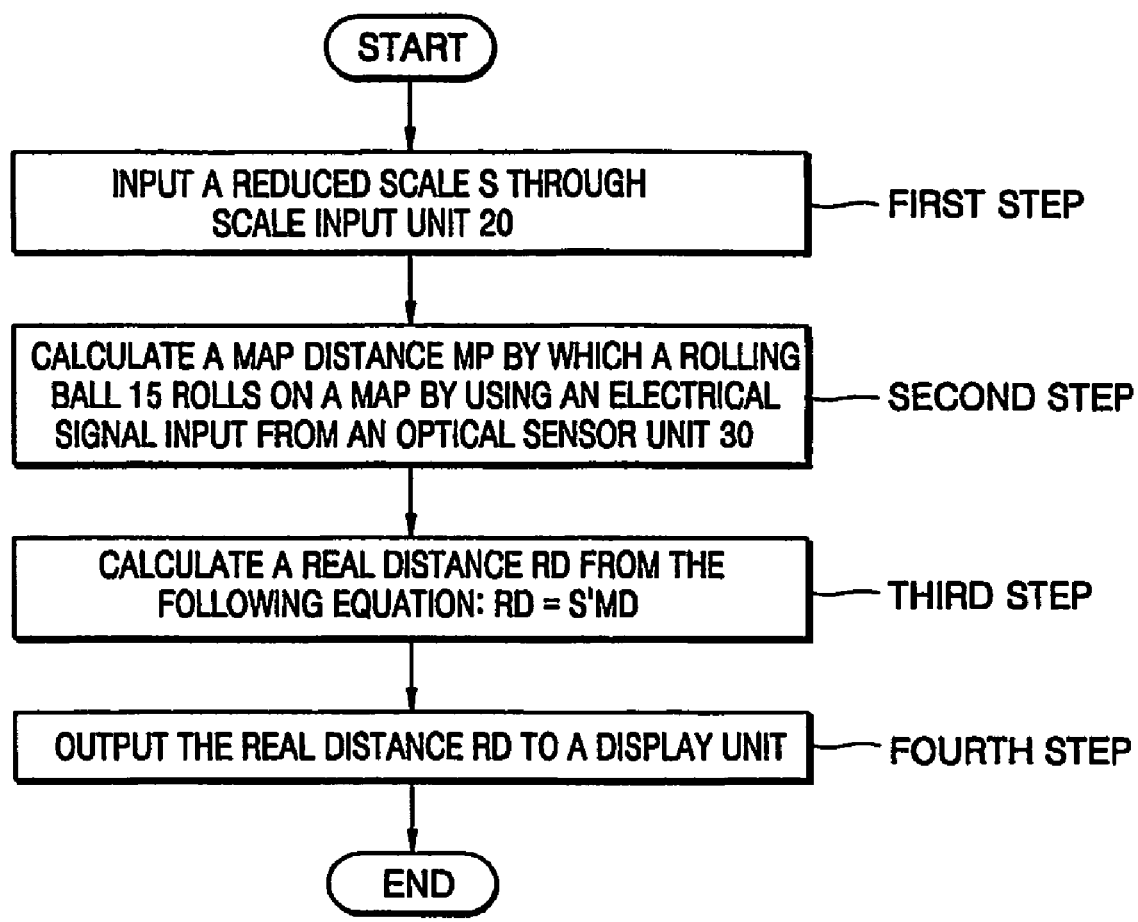
FIG. 3 is a flowchart illustrating operation of a calculation unit of the distance calculating apparatus shown in FIG. 1.

The calculation algorithm of the calculation unit 40 will be described with reference to FIG. 3. First, the reduced scale S of a map is input and stored in advance (first operation), the map distance over which the rolling ball 15 rolls on the map is obtained using the electrical signal input from the conversion and output unit 36 of the optical sensor unit 30 (second operation), the real distance is calculated by multiplying the map distance by the reduced scale S (third operation), and then the calculated real distance is output to the display unit described later (fourth operation).

The specific construction of the electrical circuit that performs the calculation function can be embodied using a well-known technology, and thus a description thereof will be omitted.

The display unit 50 is disposed inside the housing 10 and displays the real distance calculated by the calculation unit 40, so that a user can read the real distance with his naked eyes.

The input button unit 60 is disposed inside the housing 10 and inputs a signal to the calculation unit 40 indicating that the rolling ball 15 of the housing 10 is positioned at the first point A or the second point B.

Usage and advantages of the distance calculating apparatus 1 according to the present embodiment will now be described.

First, the on/off switch 12 on the housing 10 of the distance calculating apparatus 1 is turned on. Then, the light emitter 32 supplied with power emits light. At this time, the power is supplied to the calculation unit 40 as well as the display unit 50, the scale input unit 20, etc. via the calculation unit 40.

Referring to FIG. 2, after a user grasps the body of the housing 10 and places the rolling ball 15 on the first point A, the input button unit 60 is pressed to indicate to the calculation unit 40 that the present position of the rolling ball 15 is the first point A.

Thereafter, the housing 10 is moved along the map path MP such that the rolling ball 15 rolls. When the rolling ball 15 rolls and the housing 10 is moved, the light incident on the rolling ball 15 from the light emitter 32 and sensed by the light receiver 34 varies as the rolling ball 15 rotates inside the housing 10. The variation in the light sensed by the light receiver 34 is converted into an electrical signal that is output to the calculation unit 40. The housing 10 is moved to the second point B, and the rolling ball 15 rolls without slipping. Then, when the rolling ball 15 reaches the second point B, the input button unit 60 is pressed to indicate to the calculation unit 40 that the present position of the housing 10 is the second point B. Then, the calculation unit 40 recognizes the second point B and calculates a distance over which the rolling ball has rolled from the first point A to the second point B.

Finally, as described above, the calculation unit 40 calculates the real distance using the input reduced scale S and the rolling distance (map distance) of the rolling ball 15 and outputs the real distance to the display unit 50, and the real distance is displayed in the display unit 50. The unit of numerals to be displayed in the display unit 50 may be set to kilometres (Km).

The distance calculating apparatus 1 of the present embodiment can conveniently display the real distance between two points in the display unit 50, by only inputting the reduced scale S of a map and simply moving the pen-shaped housing 10 along the map path MP connecting the two points on the map. Further, it is possible to conveniently obtain a length of a second path by turning off and then turning on again the distance calculating apparatus 1 using the on/off switch 12 and moving the rolling ball 15 over the second path between the first point A and the second point B, and thus compare the two distances. On the other hand, the distance measuring apparatus 1 may comprise a reset button.

Since the housing 10 has a pen shape, it is possible to conveniently transport the distance calculating apparatus 1 when not using the distance calculating apparatus 1 and to simply and conveniently perform measurements with the distance calculating apparatus 1.

Since the rolling ball 15 is disposed at the lower end of the housing 10, it is possible to easily move the distance calculating apparatus 1 along the map path.

Furthermore, since the lattice-shaped pattern 17 is formed on the rolling ball 15, the light receiver 34 can easily sense the variations in the reflected light.

Although the lattice-shaped pattern 17 is formed on the rolling ball 15 in the present embodiment, the present invention is not limited to this, and the pattern may have a dense dot shape.

Further, although the input button unit 60 is included in the present embodiment, the present invention is not limited to this, and another method of indicating to the calculation unit 40 that the pen is over the first point A and the second point B may be used.

Figure 4:
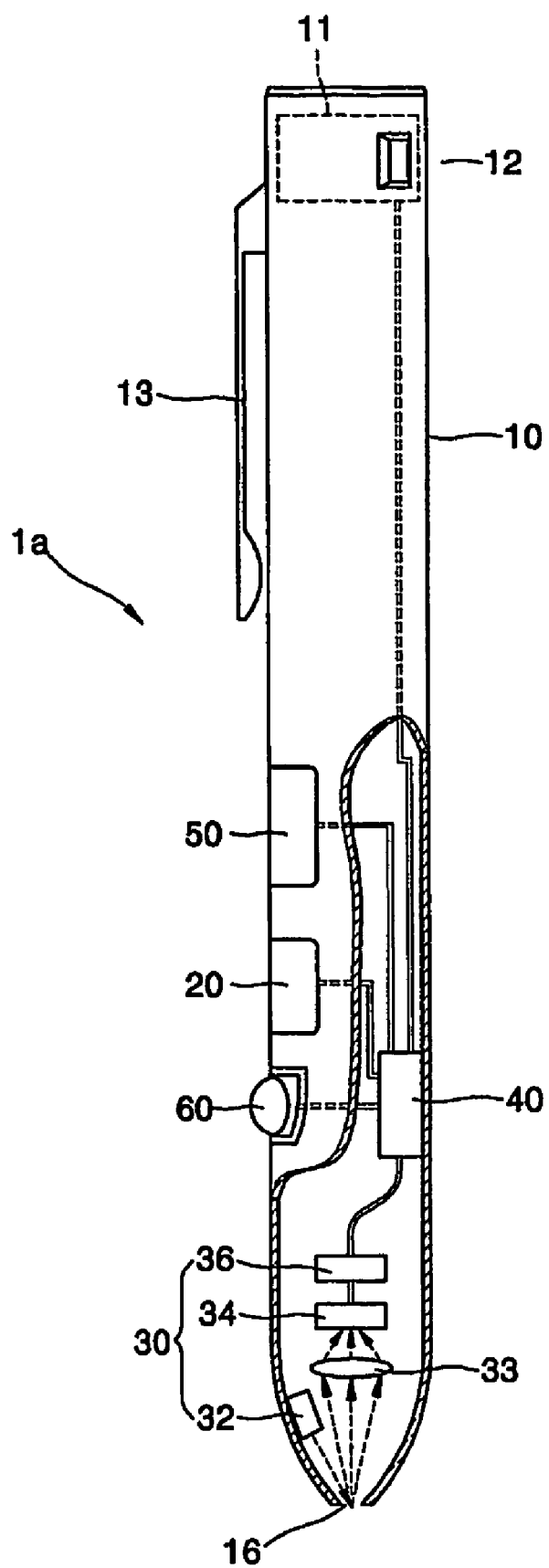
FIG. 4 is a diagram schematically illustrating a distance calculating apparatus according to a second embodiment of the present invention.

FIG. 4 shows a distance calculating apparatus 1a according to another embodiment of the present invention.

The distance calculating apparatus 1a according to the second embodiment is different from the distance calculating apparatus 1 according to the first embodiment in that the distance calculating apparatus 1a according to the second embodiment does not comprise the rolling ball 15. That is, the light emitted from the light emitter 32 is reflected from the map, not the rolling ball 15. The light is incident on and reflected from the map through an opening 16 formed in the lower end portion of the housing 10, and is then sensed by the light receiver 34. In order to effectively focus the reflected light on the light receiver 34, the distance calculating apparatus may comprise a focusing lens 33. In this case, the housing 10 is stood vertically with the lower end portion of the housing 10 contacting the map when moved along the map path MP.

The distance calculating apparatus 1a according to the second embodiment can attain the same advantages as the distance calculating apparatus 1 according to the first embodiment other than the advantage due to the rolling ball 15. In the case of the apparatus 1a, changing optical characteristics of the map itself, rather than those of a rolling ball, are detected and used to measure distance.

Figure 5:
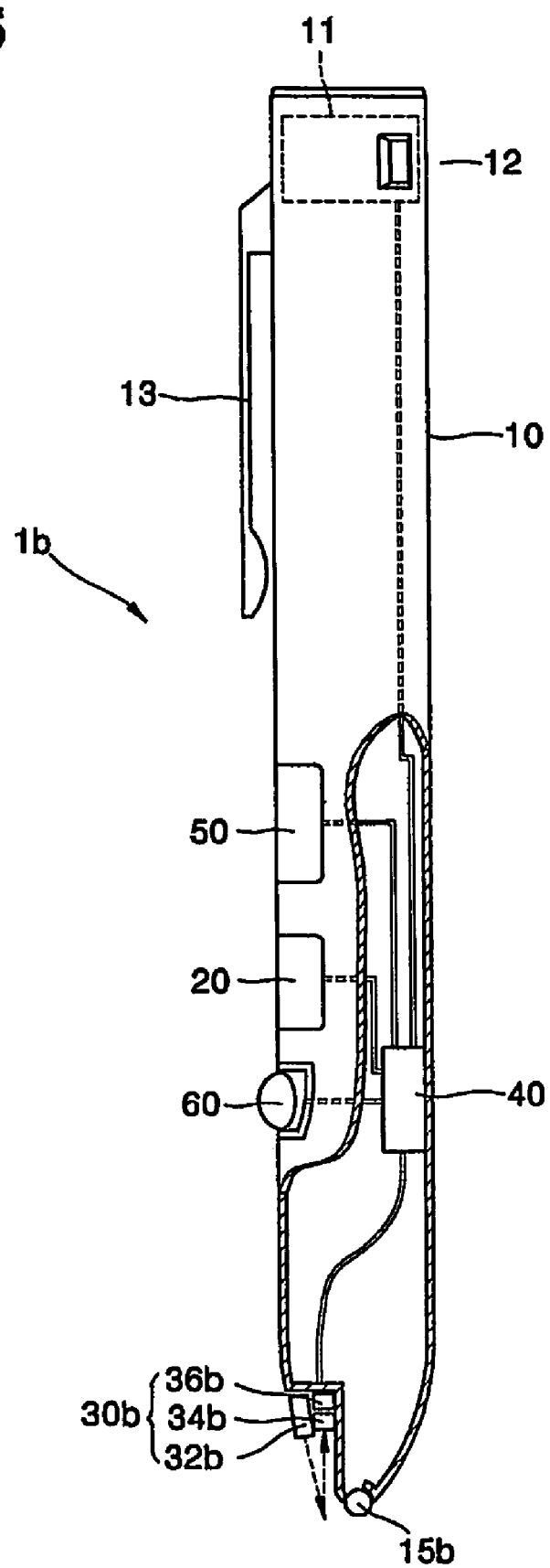
FIG. 5 is a diagram schematically illustrating a distance calculating apparatus according to a third embodiment of the present invention.

FIG. 5 shows a distance calculating apparatus 1b according to another embodiment of the present invention.

The distance calculating apparatus 1b according to the third embodiment is different from the distance calculating apparatus 1 according to the first embodiment in that an optical sensor unit 30b of the third embodiment is disposed outside the housing 10 and a pattern 17 is not formed on a rolling ball 15b. Except for these differences, the distance calculating apparatus 1b according to the third embodiment is equivalent the distance calculating apparatus 1 according to the first embodiment.

That is, a light emitter 32b, a light receiver 34b, and a conversion and output unit 36b of the optical sensor unit 30b are disposed outside the lower end portion of the housing 10. The light emitted from the light emitter 32b is reflected from the map, not from the rolling ball 15b, and is sensed by the light receiver 34b disposed outside the housing 10. The operation and function of the conversion and output unit 36b are equivalent to those of the first embodiment.

On the other hand, the rolling ball 15b not having the pattern 17 serves as a guide allowing the housing 10 to be smoothly moved along the map path MP. The housing 10 can be stood vertically on the map with the lower end portion of the housing 10 contacting the map when moved along the map path MP.

The distance calculating apparatus 1b according to the third embodiment can attain the same advantages as the distance calculating apparatus 1 according to the first embodiment other than the advantage due to the pattern 17.

As described above, the distance calculating apparatus according to the present invention can conveniently and accurately obtain a real distance between two points by only inputting a reduced scale of a map and moving the distance calculating apparatus along a path connecting the two points on the map.

The invention claimed is:

1. A distance calculating apparatus calculating a real distance from a map distance of a map path connecting a first point and a second point on a map, the apparatus comprising:

a housing;

a scale input unit into which a reduced scale is input, disposed in the housing;

an optical sensor unit disposed in the housing, the optical sensor unit sensing a movement of the housing using light and outputting an electrical signal when the housing is moved along the map path;

a calculation unit disposed in the housing, the calculation unit calculating the map distance using the electrical signal input from the optical sensor unit and calculating the real distance using the map distance and the reduced scale input from the scale input unit; and a display unit disposed in the housing, the display unit displaying the real distance calculated by the calculation unit, wherein the optical sensor unit comprises;

a light emitter emitting light;

a light receiver sensing light reflected after being emitted from the light emitter; and a conversion and output unit converting variations in the light sensed by the light receiver into an electrical signal and outputting the electrical signal when the housing is moved, wherein the housing has a pen shape, and the light emitter is disposed at the lower portion of the housing, and the light emitted from the light emitter is incident on and reflected from the map.

2. The distance calculating apparatus according to claim 1, further comprising a rolling ball rotatably coupled to the lower end of the housing such that the housing can roll over a surface of the map while being in contact with the surface of the map when moving the housing along the map path, wherein the housing has a pen shape.

3. The distance calculating apparatus according to claim 1, wherein the housing further comprises an input button unit indicating to the calculation unit that the housing is positioned at the first point or the second point on the map.

* * * * *